No. 638,993. Patented Dec. 12, 1899.
C. SCHRADER & J. OVERMAN.
MACHINERY FOR DRYING CORD.
(Application filed Feb. 3, 1899.)

(No Model.) 2 Sheets—Sheet 1.

Witnesses
Chas E Everitt
K. Smith

Inventors
Charles Schrader
John Overman
per Wm Hubbell Fisher
Attorney

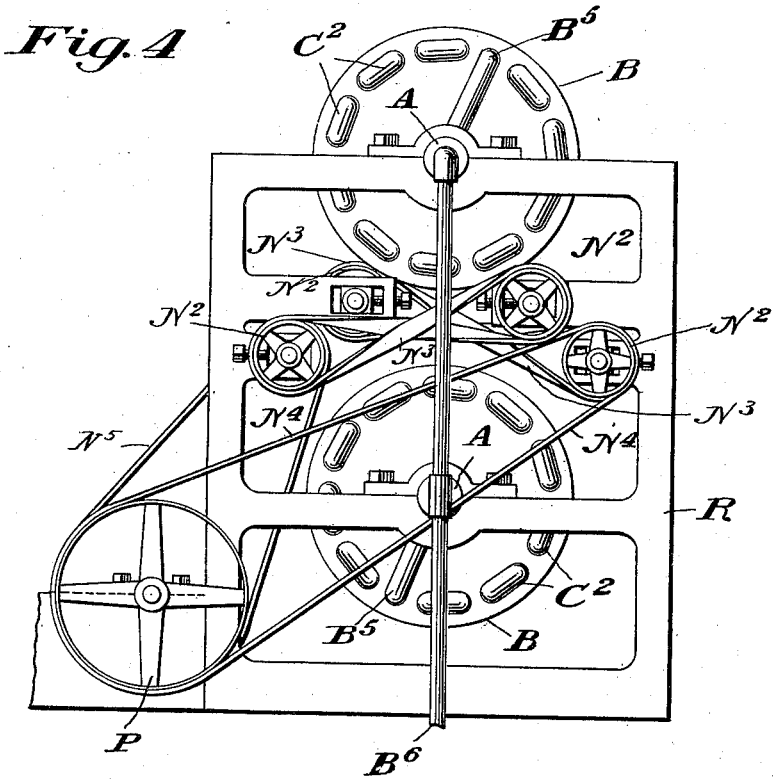

UNITED STATES PATENT OFFICE.

CHARLES SCHRADER, OF CINCINNATI, OHIO, AND JOHN OVERMAN, OF COVINGTON, KENTUCKY.

MACHINERY FOR DRYING CORD.

SPECIFICATION forming part of Letters Patent No. 638,993, dated December 12, 1899.

Application filed February 3, 1899. Serial No. 704,400. (No model.)

*To all whom it may concern:*

Be it known that we, CHARLES SCHRADER, a resident of the city of Cincinnati, in the county of Hamilton and State of Ohio, and JOHN OVERMAN, a resident of the city of Covington, in the county of Kenton and State of Kentucky, citizens of the United States of America, have invented certain new and useful Improvements in Machinery for Drying Cord, of which the following is a specification.

Our improvements are advantageous for drying cord, twine, yarn, and the like when the same is for any reason moist or wet.

The improvements are advantageous for drying cord, twine, yarn, and the like when the latter has received a paste which has been applied thereto as a coating or has also been incorporated with the cord itself.

The primary object of our invention is to dry cord or twine to which paste or the like or moisture has been applied.

The invention relates particularly, first, to novel and exceedingly useful improvements in the drying cylinder or cylinders, and, secondly, to the combination of the same with the rubbing-rollers.

The several features of our invention and the various advantages resulting from their use conjointly or otherwise will be apparent from the following description and claim.

Figure 1:
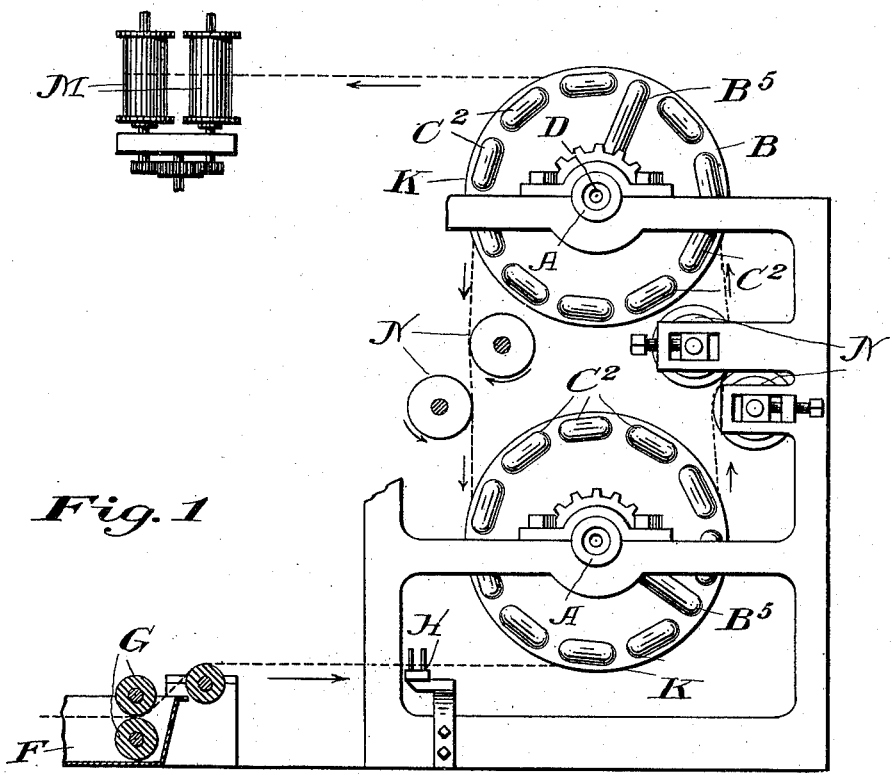
Figure 2:
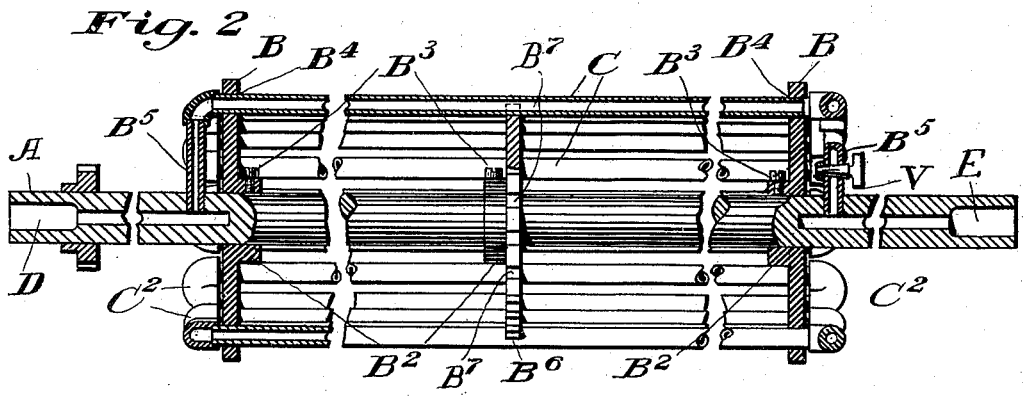
Figure 3:
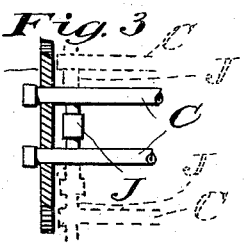

In the accompanying drawings, making part of this application and in which similar letters of reference indicate corresponding parts, Figure 1 is a vertical elevation of certain mechanism illustrating our invention. A portion of the paste-pan and certain rolls in proximity thereto are shown in vertical transverse section. Fig. 2 is a view illustrating the parts of the drying-cylinder, their construction, mode of combination, and the supporting actuating-shaft thereof. This view is partly in elevation and partly in section. Fig. 3 is a detail showing modifications of certain features of our invention, the tubing and connecting-pipes being shown partly in solid and partly in dotted lines and the supporting-disk being shown partly in section. Fig. 4 is a partial side elevation of the machine, showing the means for driving the shafts on the polishing-rolls.

The application of paste or an equivalent substance or moisture to cord or twine and the like has been in use for a long time. So, also, the application of heat to the cord or twine to properly dry the cord or twine after the latter has received the application of paste is quite old.

In the remainder of this application, for economy of description, the term "cord" when used is to be understood to include the terms "twine," "string," "yarn," and the like. The term "yarn" not only means what is commonly known as "yarn," but in the technical language of twine manufacture means "a twine of a single strand."

We have been accustomed in our manufacture of cord which is to receive an application of paste to treat the same generally as follows: The cord is drawn from the bobbin and duly passed through one or more baths of liquid paste or equivalent substance, in connection with devices for incorporating the paste into the texture or body of the cord, and after the paste has been thoroughly applied to the cord the latter is wound onto revolving drums filled with heated air or steam. By them it is duly dried, and while thus moving upon and around the two drums we are accustomed to polish it by means of rubbing-rollers suitably located and rapidly revolving. After being dried and polished the finished twine is wound onto the receiving-bobbin. Thus the operation is completed.

Heretofore we have been accustomed to make each of the drums as follows: We provided disks and fastened them to a shaft concentric therewith. Then we covered these disks with a sheet-metal (iron) envelop, thus securing a hollow cylinder, of which the sheet metal constituted the peripheral surface. Means for duly admitting steam to one end of the cylinder and for allowing it to escape as desired from the other end of the latter were present, and the cylinder was heated thereby.

Our improvements are as follows: We provide a shaft A. Upon this are mounted disks B. The preferred mode of mounting them is by means of collars or hubs $B^2$, the shaft being passed through the disk and collar. Each disk is duly fixed to the shaft by key or feather or set-screw $B^3$, preferably the latter, passing through the collar and screwed against the shaft A. The disks are concentric with the shaft. In each end disk there are perforations $B^4$, lying near the peripheral edge of the disk and in a circle described from the center of the disk. Through the corresponding perforations of opposite end disks passes a pipe C. Then this pipe at one end bends back and passes through the next perforation in the same disk, and then extending to the opposite end disk passes through the adjacent perforation, then it curves forward and back and enters the next perforation, and then returns to and passes through the next perforation in the disk, and thus continues to do until it has successively entered all of the perforations of the end disks. It thus becomes, so far as its construction is concerned, a hollow rod, tube, or piping winding back and forth after the manner of a worm. At the same time its straight lengths between the disks constitute, in combination with the disk, a hollow cylindrical body whose peripheral portion consists of hollow rods or pipes. This piping is utilized for drying the cord. Steam or hot air or other hot gas or a hot liquid is fed into one end of this pipe-coil and allowed to escape at the other end. Such admission of the heating fluid to the coil and discharge therefrom are to be made in such a manner as not to interfere with the proper rotation of the cylinder. A preferred means of such admission and discharge is as follows: One end of the shaft is hollow for a given distance, forming a tubular passage D. This passage is then contracted to about the diameter of the tubing C. One end of the latter is extended down by a tubular extension $B^5$, as shown, and is at the shaft duly connected with the contracted portion of this passage D. This constitutes the admission-inlet. The stationary pipe for conveying the hot fluid to the tubing is duly connected to passage D by a coupling, (forms of which are well known,) which latter allows the shaft to revolve and receive the hot fluid, and yet prevents the latter from escaping at said coupling or joint. The other end of the shaft is hollow for a given distance, forming a tubular passage E. This passage is then contracted to about the diameter of the tubing C. The opposite end of the tubing C is connected to the contracted end of this passage E. Through the latter the fluid passing through the tubing C discharges into the open air or into a suitable tubular connection for carrying it farther away from the machine before it can discharge. Should the fluid passing through the tubing C be a gas, it may exit, if desired, at the end of such tubing without passing through such shaft.

There is preferably present a valve V for regulating the flow of the heating fluid through the tubing C. This valve may be located at any proper and convenient place in the inlet-conduit or in the tubing C, but is preferably located in the discharge-pipe $B^5$, as shown in Fig. 2.

The tubing C may be in a continuous piece or pieces suitably united. The bends $C^2$ of the tubing C may be integral with the tubing and bent therewith. The preferred mode of making them and of connecting them to other portions of the tubing is as follows: Each bend $C^2$ is formed in substantially a semicircle, and in each end portion of the bend there is cut a female screw-thread. On each end portion of the straight portions of the tubing is cut a male screw. These straight portions of the tubing extend through the perforations $B^4$, and their ends extend out beyond the outer sides of the disk and are there screwed to the bends. Thus is formed a strong, compact, economical, and useful cylinder. It will be understood that the bends $C^2$ can be united to the straight portions of the tubing otherwise than as described—for instance, by what are known as "pipe-couplings," of which latter there are many kinds publicly known and in use. The straight portions may be connected at their end portions (preserving the worm-like circulatory form) otherwise than as shown. One such modified plan of connection would be to head up the ends of the straight portions and connect the pipes by suitable connections J or the like at a point inside the disk, substantially as shown in Fig. 3; but the construction heretofore described is the preferred one.

The mode in which our invention operates will be, no doubt, already understood.

Although only one of the drying-cylinders might be employed by proper collocation thereof and of the accompanying mechanism, it is nevertheless desirable to operate with two of them. Then there will be present one or more suitable paste-pans F and rollers G or like means for thoroughly incorporating the paste with the texture or body of the cord. In the present illustrative instance the cord after having been passed down into the paste passes between the rollers G. The latter are heavy and usually of copper to prevent undue oxidation. The upper roller is free to move up or down, as its journals are in vertically-slotted bearings. (Not shown, but sufficiently understood because of a common construction.) The weight of the upper roller G causes the cord to be compressed between it and the under roller. Thus the paste is pressed into the cord. The cord then passes up and over a guide H, preferably a roller, and thence suitably guided passes to the revolving cylinder K, already described, and thence passes up and around the upper cylinder K, likewise already described, and thence down around the lower cylinder, and thence up and around the upper cylinder. The cord is thus wound around these two cylinders as many times as desired. The number of such windings may depend upon the thickness of the cord or the amount of heat emanating from the tubing C, or the character of the paste or like material employed, or upon two or all of these conditions. Some pastes or moisture by reason of their nature require more time and heat than others for drying. After the cord has fully dried it is wound off the cylinders onto suitable bobbins M.

As we desire the processes of rubbing and polishing of the cord to take place simultaneously with the drying of the same, we have the cord as wound around the cylinders, as it passes from cylinder to cylinder, to pass between the rubbing-rollers N N, one pair of which is located at one side, so as to operate on the cord passing up and around the copper cylinder and the other pair to operate on the cord on the other side as it passes down and around under the lower cylinder. In each instance the cord passes between the rubbing-rollers of a given pair, and these rollers always travel in a direction the opposite to that in which the cord is moving. The number of pairs of these rollers to be employed is optional. The rollers are preferably adjustable to or from the common plane of the axis of the cylinder and are usually so adjusted as to cause the cord to bend over one and back over the other, substantially as shown, thus creating a sufficient friction between the rollers and cord to enable the rollers to rub down the wet or moist paste and fiber of the cord, and finally to polish the same. A common and preferred mode of adjustment of the rollers is shown in connection with the rollers N. When the cord has been thus treated by the rubbing-rollers and the drying-cylinders, it comes therefrom dry and highly polished.

The preferred driving means for rotating the polishing-rollers is as follows: On the shaft of each polishing-roller is concentrically fixed a pulley $N^2$. There is a power driving-pulley P. A pulley-band $N^4$ extends from the latter to the lower pulley $N^2$ on the right-hand side. (See Fig. 4.) From the latter pulley a pulley-band $N^2$ extends to the upper pulley $N^2$ on the left-hand side. Thus two of the rollers N are operated. From the power-pulley P another band $N^5$ extends to the lower pulley $N^2$ on the left-hand side, and from the last-named pulley a band extends to the upper pulley $N^2$ on the right-hand side. Thus all of the rollers N are duly operated.

Our improvements possess many advantages over the sheet-iron cylinders we have heretofore used. The new cylinder is stronger. It is more durable and less expensive in construction. While there is somewhat less heating-surface, the operator has much better control of the heating capacity. The cylinder gives a more even tension and has more frictional tractive force. It can, if overheated, be cooled off faster, and thus prevent the doing of harm to the cord by overheating it when in contact with the cylinder.

The pipes or tubing C are made of any suitable material. In many instances the same should be made of copper or zinc to prevent oxidation.

In the drawings we have shown the location of the bobbins M conventionally and so as to come within the space of the limits of the drawings. In practice these bobbins are lower down and farther off than shown in the drawings.

Where the cylinder is of length, we provide one or more disks $B^6$, as desired, and locate them on the shaft A between the end disks aforementioned. This disk or disks support the pipes between the end disks—that is to say, they prevent the inward deflection of the pipes or tubing C by reason of the pressure of the cord thereon. The peripheral edge of each of these disks is provided with recesses or shoulders $B^7$, substantially as shown, and in each of these recesses there lies a tube C, the latter resting on the bottom of the recess. The peripheral edge of these intervening disks does not extend beyond the outer surface of the cylinder as presented by the tubing and preferably stops a little short of the same. Thus these disks cannot interfere with the proper and even winding of the cord thereon.

In the ordinary courses of present manufacture the paste or moisture is for the most part applied to certain classes of cord, ranging from twine of extremely-small size to cord of half an inch in diameter.

That feature of our invention which consists in a network of pipes filled with a heating fluid and arranged to receive the fluid and to allow of its discharge may be utilized in various ways other than mentioned. To instance one mode of a number that may be utilized is indicated by dotted lines in Fig. 3 and shows the tubing C connected not only by a pipe J, (shown in solid lines in alternate pairs,) but all of the pipes connected also by the pipes shown in dotted lines. Such a construction would allow the heating fluid to distribute itself in shorter circuits to the various tubings C.

We desire it to be understood that we do not confine the benefits of our invention to its use in connection with twine, cord, rope, and the like.

Our invention is advantageous so far as applicable to the drying of textile fabrics, such as woolen and cotton goods and the like, which are simply moist or to which paste or equivalent substances have been applied and to the polishing of the same in conjunction with our improvements.

What we claim as new and of our invention, and desire to secure by Letters Patent, is—

In mechanism for drying and polishing textile fabrics, a shaft, a cylinder thereon, a series of tubing whose main portions are lengths running with the axis of the cylinder, and duly connected, and forming a peripheral surface for the reception and frictional tension of the cord or other textile fabric to be wound thereon, and whose interior is a receptacle for the reception and conveyance of heated fluid, and one or more pairs of rubbing and polishing rollers N, acting upon the fabric, in close coöperation with the drying-cylinder, and operating to rub and polish the fabric while it and its constituent elements are being dried, substantially as and for the purposes specified.

CHARLES SCHRADER.
     JOHN OVERMAN.

Attest:
 SAMUEL A. WEST,
 K. SMITH.